March 3, 1964 H. F. DAVIS 3,123,774
SIGNAL AMPLITUDE DISCRIMINATOR
Filed Nov. 9, 1960
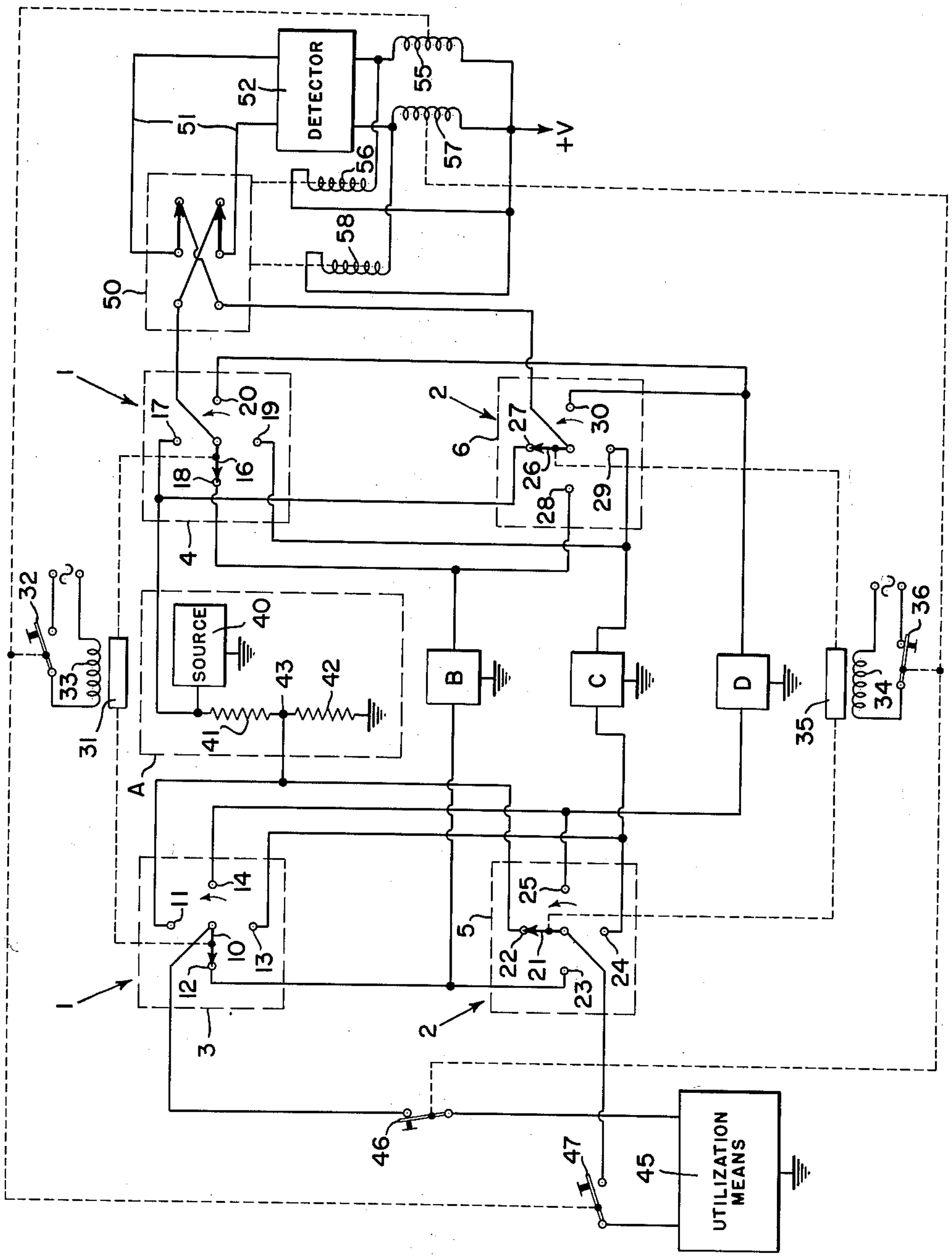
INVENTOR.
HENRY F. DAVIS
BY Arthur H. Swanson
ATTORNEY.

United States Patent Office 3,123,774

Patented Mar. 3, 1964

3,123,774

SIGNAL AMPLITUDE DISCRIMINATOR

Henry F. Davis, Worcester, Pa., assignor to Minneapolis-Honeywell Regulator Company, Minneapolis, Minn., a corporation of Delaware Filed Nov. 9, 1960, Ser. No. 68,287
5 Claims. (Cl. 328—1)

This invention relates to signal selectors. More specifically, the present invention relates to signal amplitude discriminators.

An object of the present invention is to provide an improved signal amplitude discriminator.

Another object of the present invention is to provide an improved signal amplitude discriminator for selecting the maximum amplitude signal from a plurality of input signals.

Still another object of the present invention is to provide an improved signal amplitude discriminator for selecting the minimum amplitude signal from a plurality of input signals.

A further object of the present invention is to provide an improved signal amplitude discriminator for maintaining a predetermined relationship between a selected reference signal and a plurality of comparison signals by selecting a new reference signal from the comparison signals in response to a disturbance of the relationship.

A still further object of the present invention is to provide an improved signal amplitude discriminator, as set forth herein, which is characterized by simplicity of operation and construction.

In accomplishing these and other objects, there has been provided, in accordance with the present invention, a signal amplitude discriminator having a pair of signal-selecting stepping switches. The switches are effective to sequentially connect a selected one of a plurality of input signals with each of the remaining input signals. A polarity detector is used to sense the difference between the selected signal and the compared signals. The detector may be effective to detect either the presence of a compared signal which is greater than the selected signal or the presence of a compared signal which is less than the selected signal. In either case, the detector is effective to replace the selected signal with the detected comparison signal. The new selected signal is, subsequently, compared with the other input signals including the former selected signal. This detection and substitution cycle is continuously repeated to maintain the selected signal as the detected signal whereby to retain one of the aforesaid signal relationships.

A better understanding of the present invention may be had from the following detailed description when read in connection with the accompanying drawing, in which the single figure is a schematic representation of a signal amplitude selector embodying the present invention.

Referring to the single figure in more detail, there is a signal amplitude selector having a first and a second stepping switch 1, 2. The first switch 1 has a first and second section 3, 4, and the second switch 2 has a first and second section 5, 6. Each section of the switches 1, 2 has an armature and four contacts. Thus, the first switch 1 has a switch arm 10, hereinafter referred to as a first switch arm 10 and four contacts 11, 12, 13, 14 associated therewith in the first section 3, thereof; and a switch arm 16, hereinafter referred to as a second switch arm 16, and four contacts 17, 18, 19, 20 associated therewith in the second sections 4 thereof. Similarly, a third switch arm 21 is included in the first section 5 of the second switch 2 and has four switch contacts 22, 23, 24, 25 associated therewith; and a fourth switch arm 26 is included in the second section 6 of the second switch 2 and has four switch contacts 27, 28, 29, 30. A first motor 31 is used to simultaneously drive the first and second switch arms 10, 16 of the first switch 1. The first motor 31 is connected to a source of an energizing signal through a first motor-switch 32. A second motor 34 is used to simultaneously drive the third and fourth switch arms 21, 26 of the second switch 2. The second motor 35 is connected to a source of an energizing signal through a second motor-switch 36.

A plurality of signal sources A, B, C, D are connected to corresponding contacts on the first and second switches 1, 2. The following description is specifically directed to the first signal source A but is equally applicable to the other signal sources B, C, and D. Thus, the first signal source A may comprise a signal transducer 40 which may be any suitable device capable of producing an electrical signal representative of a sensed variable; e.g., temperature, pressure, flow, etc., such devices being well-known in the art. The output signal of the transducer 40 is applied across a series connection of a first load resistor 41 and a second load resistor 42. From the junction 43 between these resistors is taken a first output signal lead from the first signal source A to carry a portion of the output signal of the transducer 40. A second output signal lead from the signal source A is taken from the output of the transducer 40 to carry the full output signal of the transducer 40. The first lead from the first source A is connected to the first contact 11 in the first section 3 of the first switch 1 and to the first contact 22 in the first section 5 of the second switch 2. Similarly, the second lead of the first source A is connected to the first contact 17 in the second section 4 of the first switch 1 and to the first contact 27 in the second section 6 of the second switch 2.

As previously mentioned, the remaining signal sources B, C, and D are substantially identical to the first source A and are similarly connected to corresponding contacts on the first and second switches 1, 2. Thus, the first lead of the second source B is connected to second contacts 12 and 23 in the first sections 3 and 5, respectively, of the first and second switches 1 and 2; and the second lead thereof is connected to the second contacts 18 and 28 in the second sections 4 and 6, respectively, of the first and second switches 1 and 2. Further, the leads from the third source C are similarly connected to the third contacts 13, 24, 19 and 29 of the first and second switches 1 and 2, and the leads from the fourth source D are connected to the fourth contacts 14, 25, 20, and 30 of the first and second switches 1 and 2, respectively.

The first switch arm 10 is connected to a utilization means 45 through a first output signal switch 46. The third switch arm 21 is connected to the utilization means 45 through a second output signal switch 47. The utilization means 45 may be any suitable device responsive to the output signal from the signal sources A, B, C, D; e.g., a recording instrument.

The second switch arm 16 is connected to a first input contact on a reversing switch 50. Similarly, the fourth switch arm 26 is connected to a second input contact on the reversing switch 50. A pair of output leads 51 are used to apply an output signal from the reversing switch 50 to a signal detector 52. The signal detector 52 may be any suitable device capable of responding to a unidirectional change in polarity of an input signal applied thereto and having a separate output signal for each polarity input; such devices being well-known in the art. For example, the detector 52 may be a bi-stable "flip-flop" circuit triggered into one of its stable states by a differential amplifier which responds to a change in polarity of an input signal. The two states of the "flip-flop" would be used as the two output signals of the detector 52. One of the output signals of the detector 52 is used to energize a first relay coil 55 and a first reversing switch coil 56. The energization of the first relay coil 55 is effective to close the first motor switch 32 and the second output signal switch 47. The energization of the first reversing switch coil 56 is effective to actuate the reversing switch 50 into a first position.

The other output signal from the detector 52 is effective to energize a second relay coil 57 and a second reversing switch coil 58. The energization of the second relay coil 57 is effective to close the second motor switch 36 and the first output signal switch 46, and the energization of the second reversing switch 58 actuates the reversing switch 50 into a second position.

The mode of operation of the apparatus of the present invention is as follows: Assume the switch arms of the stepping switches 1, 2 are initially in the positions shown in the single figure. Further, assume the detector 52 is applying an energizing signal to the second relay coil 57 and the second reversing switch coil 58. Thus, the second motor switch 36 is closed, which is effective to energize the second motor 35, and the first output switch 46 is closed to connect the first switch arm 10 to the utilization means 45. Also, the second reversing switch coil 58 is effective to actuate the reversing switch 50 to the position shown in the single figure. Since the first motor switch 32 is open, the first motor 31 is not energized and the first stepping switch 1 is stationary. On the other hand, the second motor 35 is energized, as mentioned above, and is driving the second stepping switch 2 in the direction indicated by the arrows in the single figure. Thus, the instantaneous positions of the third and fourth switch arms 21, 26 are the positions shown in the single figure whereby the output signal from the first signal source A is applied only to the detector 52 through the reversing switch 50. Since the second output signal switch 47 is open, the output signal is not applied to the utilization means 45. Instead, the closed condition of the first output signal switch 46 is effective to connect the utilization means 45 to the first switch arm 10 which, in its stationary condition, is, in turn, connected to the output signal from the second signal source B. The output signal from second signal source B is also applied through the stationary second arm 16 and the reversing switch 50 to the detector 52. Thus, the detector has applied thereto, at this instant, the output signals from the first and second signal sources A, B. These signals are arranged in an opposing relationship whereby to apply a difference signal to the detector 52.

As previously mentioned, the detector 52 is sensitive to the polarity of an applied input signal. Assume the input signal corresponding to the aforesaid difference signal is of a polarity which is not effective to disturb the initial condition of the detector. Accordingly, the second relay coil 57 remains energized, and the second stepping switch 2 is actuated by the second motor 35 to the next sequential position. In this position, the third and fourth switch arms 21, 26 are in contact with the second contacts 23, 28, respectively, of the second switch 2. In this position, the output signal from the second signal source B is applied through the fourth switch arm 16 to the detector 52. Since the output signal from the second source B is also being applied through the stationary second switch arm 16 to the detector 52, the difference signal is substantially at a zero level and is still ineffective to affect the detector 52. Accordingly, the further operation of the second motor 35 is effective to advance the second stepping switch 2 to bring the third and fourth switch arms 21, 26 in contact with the third contacts 25, 29, respectively. In this position, the output signal from the third source C is applied to the detector 52 in opposition to the retained signal from the first source A.

Assume that this difference signal is of a polarity to affect the detector 52. Thus, if the previous compared signals were smaller than the signal from the first source A then the signal from the third source C is greater than the signal from the first source A or vice versa. In either case, the difference signal is effective to shift the output signal from the second relay coil 57 to the first relay coil 55. The deenergization of the second relay coil 57 is effective to open the second motor switch 36 and the first output signal switch 46. Thus, the second motor 35 is deenergized to stop the second stepping switch 2, and the application of the output signal from the first source A to the utilization means 45 is interrupted. The stationary condition of the fourth switch arm 26 is effective to apply the output signal from the third source C as a new selected reference signal to the detector 52. Further, the energization of the first relay coil 55 is effective to close the first motor switch 32 to energize the first motor 31 and the second output signal switch 47 to apply the output signal from the third source C to the utilization means 45. Additionally, the energizing signal is also transferred from the second reversing switch coil 58 to the first reversing switch coil 56 to actuate the reversing switch 50 whereby to reverse the connection of the second switch arm 16 and the fourth switch arm 26 to the detector 52.

This reversal is effective to restore the polarity of the new difference signal to the polarity of the initial difference signal. While this reversal is a polarity reversal, the detector 52, as previously mentioned, is only sensitive to a polarity reversal in one direction; i.e., positive to negative or negative to positive. Thus, the effect of the reversing switch 50 is to restore the polarity of the difference signal to a polarity which will enable the detector 52 to sense a subsequent deviation therefrom. The energization of the first motor 31 is effective to drive the first switch 1, in the direction indicated by the arrows in the single figure, to sequentially apply the signals from the signal sources A, B, C, D to the detector 52 to be compared with the new reference signal from the third source C. The further operation of the present invention is similar to that described above with relation to the initial operation with the exception that the selected reference signal is obtained from the third source C. Accordingly, the apparatus of the present invention is effective to select a reference signal from a plurality of input signals and to compare the input signals thereto whereby to detect a predetermined polarity relationship. In the event of an interruption of the polarity relationship, a new reference signal is selected corresponding to the input signal which produced this interruption. The new selected reference signal is subsequently compared with the input signals.

Thus, it may be seen that there has been provided, in accordance with the present invention, a signal amplitude discriminator which is characterized by the ability to select a reference signal from a plurality of input signals having a predetermined relationship to the other input signals and by the ability to substitute a new reference signal to maintain this relationship.

What is claimed is:

1. A signal amplitude discriminator comprising detector means for sensing the change in polarity of an input signal to produce a first and a second energizing signal corresponding to a first and a second polarity of said input signal, respectively, a plurality of signal means, each of said signal means producing a first and a second simultaneous signal each being representative of a monitored variable, a first signal selecting means, a second signal selecting means, means connecting each of said first signals to said first selecting means and to said second selecting means, said first and said second selecting means each being operative to select one of said first signals and to apply the difference of the selected first signals to said detector means, a first driving means for sequentially operating said first selecting means, said first driving means being responsive to said first energizing signal from said detector means, a second driving means for sequentially operating said second selecting means, said second driving means being responsive to said second energizing signal from said detector means, and means responsive to said first and to said second energizing signals for distributing said second variable signals, said last mentioned means being operative to distribute a second signal from a signal means having a first signal selected by an unenergized one of said first and second selecting means.

2. A signal amplitude discriminator comprising detector means for sensing the change in polarity of an input signal to produce a first and a second energizing signal corresponding to a first and a second polarity of said input signal, respectively, a plurality of signal means, each of said signal means producing a first and a second simultaneous signal each being representative of a monitored variable, a first stepping switch signal selecting means, a second stepping switch signal selecting means, means connecting each of said first signals to a separate contact on said first selecting means and on said second selecting means, said first and said second selecting means each being operative to select one of said first signals and to apply the difference of the selected first signals to said detector means, a first driving means for sequentially operating said first selecting means, said first driving means being responsive to said first energizing signal from said detector means, a second driving means for sequentially operating said second selecting means, said second driving means being responsive to said second energizing signal from said detector means, and means responsive to said first and to said second energizing signals for distributing said second variable signals, said last mentioned means being operative to distribute a second signal from a signal means having a first signal selected by an unenergized one of said first and second selecting means.

3. A signal amplitude discriminator comprising detector means for sensing the change in polarity of an input signal to produce a first and a second energizing signal corresponding to a first and a second polarity of said input signal, respectively, a signal reversing switch responsive to said first and said second energizing signals for reversing the polarity of said input signal, a plurality of signal means, each of said signal means producing a first and a second simultaneous signal each being representative of a monitored variable, a first signal selecting means, a second signal selecting means, means connecting each of said first signals to said first selecting means and so said second selecting means, said first and said second selecting means each being operative to select one of said first signals and to apply the difference of the selected first signals to said detector means, a first driving means for sequentially operating said first selecting means, said first driving means being responsive to said first energizing signal from said detector means, a second driving means for sequentially operating said second selecting means, said second driving means being responsive to said second energizing signal from said detector means, and means responsive to said first and to said second energizing signals for distributing said second variable signals, said last mentioned means being operative to distribute a second signal from a signal means having a first signal selected by an unenergized one of said first and second selecting means.

4. A signal amplitude discriminator comprising detector means for sensing the change in polarity of an input signal to produce a first and a second energizing signal corresponding to a first and a second polarity of said input signal, respectively, a plurality of signal means, each of said signal means producing a first and a second simultaneous signal each being representative of a monitored variable, a first signal selecting means, a second signal selecting means, means connecting each of said first signals to said first selecting means and to said second selecting means, said first and said second selecting means each being operative to select one of said first signals and to apply the difference of the selected first signals to said detector means, a first driving means for sequentially operating said first selecting means, said first driving means being responsive to said first energizing signal from said detector means, a second driving means for sequentially operating said second selecting means, said second driving means being responsive to said second energizing signal from said detector means, and distributing means responsive to said first and to said second energizing signals for distributing said second signals, said distributing means including a first signal distributing means, a second signal distributing means, means connecting each of said second signals to said first distributing means and to said second distributing means, said first distributing means being sequentially operated by said first driving means and said second distributing means being sequentially operated by said second driving means, a first signal connecting means responsive to said second energizing signal for connecting an output signal from said first distributing means and a second signal connecting means responsive to said first energizing signal for connecting an output signal from said second distributing means, said distributing means being operative to distribute a second signal from a signal means having a first signal selected by an unenergized one of said first and second selecting means.

5. A signal amplitude discriminator comprising detector means for sensing the change in polarity of an input signal to produce a first and a second energizing signal corresponding to a first and a second polarity of said input signal, respectively, a plurality of signal means, each of said signal means producing a first and a second simultaneous signal each being representative of a monitored variable, a first stepping switch signal selecting means, a second stepping switch signal selecting means, means connecting each of said first signals to a separate contact on said first selecting means and on said second selecting means, said first and said second selecting means being operative to select one of said first signals and to apply the difference of the selected first signals to said detector means, a first driving means for sequentially operating said first selecting means, said first driving means being responsive to said first energizing signal from said detector means, a second driving means for sequentially operating said second selecting means, said second driving means being responsive to said second energizing signal, and distributing means responsive to said first and said second energizing signals for distributing said second signals, said distributing means including a stepping switch distributing means, a second stepping switch distributing means, means connecting each of said second signals to a separate contact on said first and said second distributing means, said first distributing means being sequentially operated by said first driving means and said second distributing means being sequentially operated by said second driving means, a first signal connecting means responsive to said second energizing signal for connecting an output signal from said first distributing means and a second signal connecting means responsive to said first energizing signal for connecting an output signal from said second distributing means, said distributing means being operative to distribute a second signal from a signal means having a first signal selected by an unenergized one of said first and second selecting means.

No references cited.